United States Patent
Fitterer et al.

(10) Patent No.: US 9,003,483 B2
(45) Date of Patent: *Apr. 7, 2015

(54) UNIFORMLY TRANSFORMING THE CHARACTERISTICS OF A PRODUCTION ENVIRONMENT

(71) Applicant: International Business Machines Corporation, Armonk, NY (US)

(72) Inventors: Annemarie R. Fitterer, Austin, TX (US); Nicholas S. Lloyd, Round Rock, TX (US); Rama Mohan Thulasi Reddy, Austin, TX (US); Aruna Yedavilli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/072,862

(22) Filed: Nov. 6, 2013

(65) Prior Publication Data

US 2014/0165135 A1    Jun. 12, 2014

Related U.S. Application Data

(63) Continuation of application No. 13/710,597, filed on Dec. 11, 2012.

(51) Int. Cl.
*G06F 21/00* (2013.01)
*G06F 21/57* (2013.01)
(Continued)

(52) U.S. Cl.
CPC ............... *G06F 21/57* (2013.01); *G06F 21/53* (2013.01); *G06F 21/10* (2013.01); *G06F 21/00* (2013.01); *G06F 9/44* (2013.01)

(58) Field of Classification Search
CPC ....... G06F 21/53; G06F 21/57; G06F 9/5077; G06F 21/575; G06F 21/604; G06F 21/6218; G06F 8/61; G06F 2221/2149; G06F 9/4401; G06F 9/45533; G06F 2221/2141; G06F 21/00; G06F 21/10; G06F 9/44; H04L 63/10
USPC ....................... 726/1, 2, 4, 26, 28; 713/1, 189
See application file for complete search history.

(56) References Cited

U.S. PATENT DOCUMENTS

| 7,426,752 | B2 | 9/2008 | Agrawal et al. |
| 7,480,898 | B2 | 1/2009 | Batten et al. |

(Continued)

*Primary Examiner* — Chau Le
*Assistant Examiner* — Don Zhao
(74) *Attorney, Agent, or Firm* — Daniel R. Simek

(57) ABSTRACT

Embodiments of the present invention disclose a method, computer program product, and system for generating a secure sandbox environment. A computer identifies components of a production environment that utilizes sensitive information during operation. The components of the production environment can include one or more server computers, one or more storage devices, and one or more applications. The computer receives a security policy that defines what constitutes sensitive information, and in response identifies the sensitive information of the production environment. The computer modifies the sensitive information such that the production environment can utilize the sensitive information without error, and such that the sensitive information cannot be identified from the modified sensitive information. The computer generates the sandbox environment, based at least in part, on the identified components of the production environment and the modified sensitive information.

9 Claims, 3 Drawing Sheets

(51) Int. Cl.
  *G06F 21/53* (2013.01)
  *G06F 21/10* (2013.01)
  *G06F 9/44* (2006.01)

(56) References Cited

U.S. PATENT DOCUMENTS

| | | |
|---|---|---|
| 7,509,684 B2 | 3/2009 | McDonald et al. |
| 7,908,653 B2 * | 3/2011 | Brickell et al. ............ 726/22 |
| 8,069,053 B2 | 11/2011 | Gervais et al. |
| 8,239,939 B2 * | 8/2012 | Dunagan et al. ............ 726/22 |
| 2005/0147240 A1 | 7/2005 | Agrawal et al. |
| 2007/0226773 A1 * | 9/2007 | Pouliot ............................ 726/1 |
| 2008/0066167 A1 * | 3/2008 | Andri ............................... 726/5 |
| 2008/0235759 A1 * | 9/2008 | McCarty .......................... 726/1 |
| 2008/0282096 A1 | 11/2008 | Agrawal et al. |
| 2009/0276771 A1 * | 11/2009 | Nickolov et al. ............ 717/177 |
| 2009/0319588 A1 | 12/2009 | Gandhi et al. |
| 2010/0138639 A1 * | 6/2010 | Shah et al. .................... 712/227 |
| 2010/0192220 A1 | 7/2010 | Heizmann et al. |
| 2011/0264631 A1 | 10/2011 | Sharma et al. |
| 2011/0289356 A1 * | 11/2011 | Hossain et al. ............. 714/38.1 |
| 2012/0180029 A1 * | 7/2012 | Hill et al. ..................... 717/135 |
| 2012/0222084 A1 * | 8/2012 | Beaty et al. ..................... 726/1 |
| 2012/0233668 A1 * | 9/2012 | Leafe et al. ..................... 726/4 |
| 2013/0019282 A1 * | 1/2013 | Rice et al. ....................... 726/4 |
| 2013/0046965 A1 * | 2/2013 | Vin et al. ......................... 713/1 |
| 2013/0111260 A1 * | 5/2013 | Reddy et al. ................ 714/4.11 |

\* cited by examiner

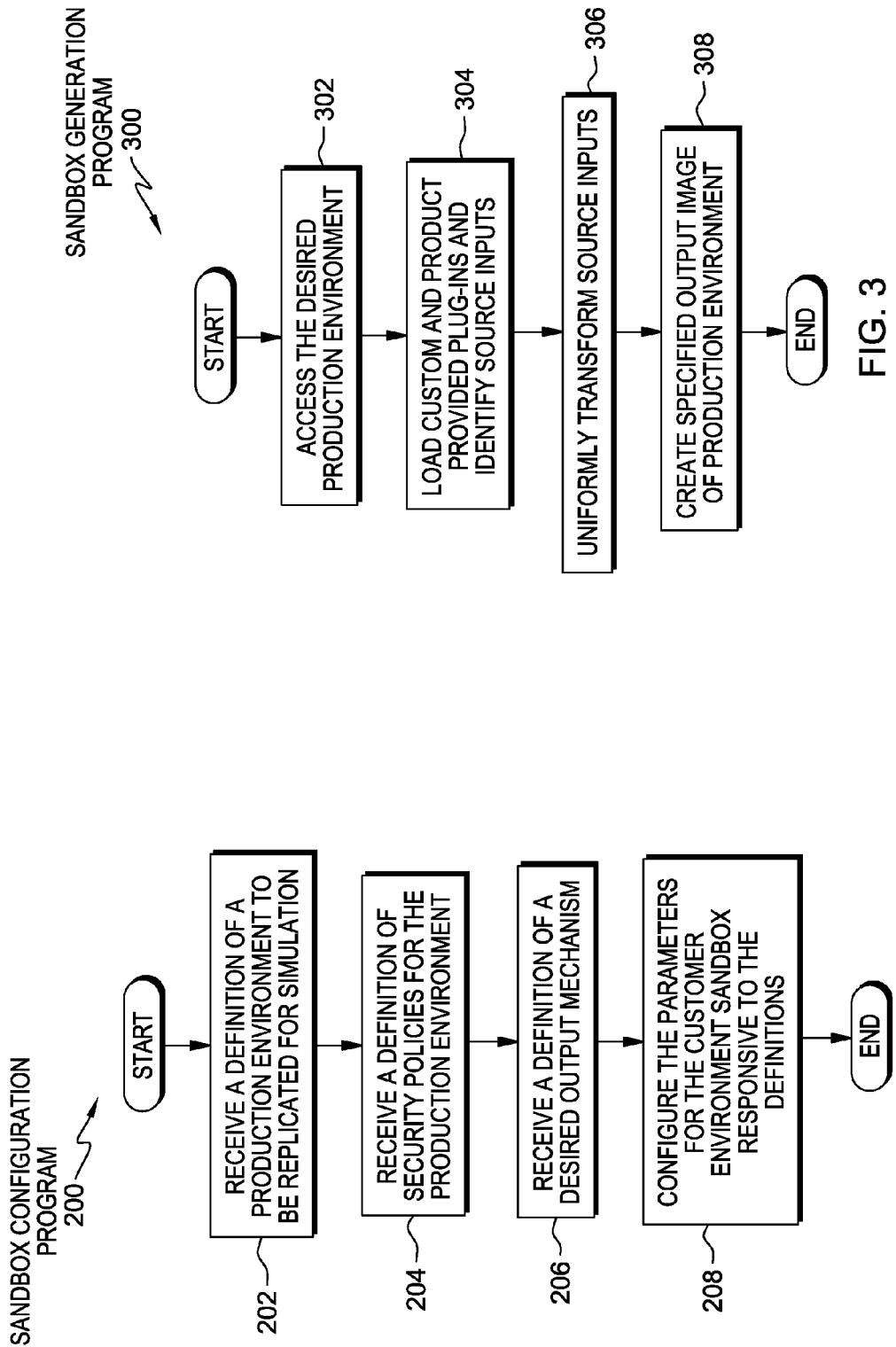

UNIFORMLY TRANSFORMING THE CHARACTERISTICS OF A PRODUCTION ENVIRONMENT

CROSS-REFERENCE TO RELATED APPLICATIONS

This application is a continuation of U.S. patent application Ser. No. 13/710,597 filed on Dec. 11, 2012, the entire content and disclosure of which is incorporated herein by reference.

FIELD OF THE INVENTION

The present invention relates generally to the field of information security, and more particularly to generating a secure sandbox environment replication of a production environment.

BACKGROUND OF THE INVENTION

In business environments, information security and environment stability is critical. Quick resolutions are required for issues that can impact the capabilities of the production environment. One way in which businesses attempt to mitigate the potential risks in production environments is to develop stringent change control processes and quality testing environments. However, some quality testing environments may not be an adequate representation of a certain production environment. In such a case, there is significant risk to the businesses' production environment, and unexpected issues can arise. A quality testing environment is a setup of hardware and software which is used to determine whether a production environment will operate as intended. Many production environments contain sensitive information which a business is not willing to expose in a testing environment.

SUMMARY

Embodiments of the present invention disclose a method, computer program product, and system for generating a secure sandbox environment. A computer identifies components of a production environment that utilizes sensitive information during operation. The components of the production environment can include one or more server computers, one or more storage devices, and one or more applications. The computer receives a security policy that defines what constitutes sensitive information, and in response identifies the sensitive information of the production environment. The computer modifies the sensitive information such that the production environment can utilize the sensitive information without error, and such that the sensitive information cannot be identified from the modified sensitive information. The computer generates the sandbox environment, based at least in part, on the identified components of the production environment and the modified sensitive information.

BRIEF DESCRIPTION OF THE SEVERAL VIEWS OF THE DRAWINGS

FIG. 2 is a flowchart depicting operational steps of a program for configuring the parameters of a customer environment sandbox, in accordance with an embodiment of the present invention.

FIG. 3 is a flowchart depicting operational steps of a program for generating a customer environment sandbox responsive to defined parameters, in accordance with an embodiment of the present invention.

DETAILED DESCRIPTION

Figure 1:
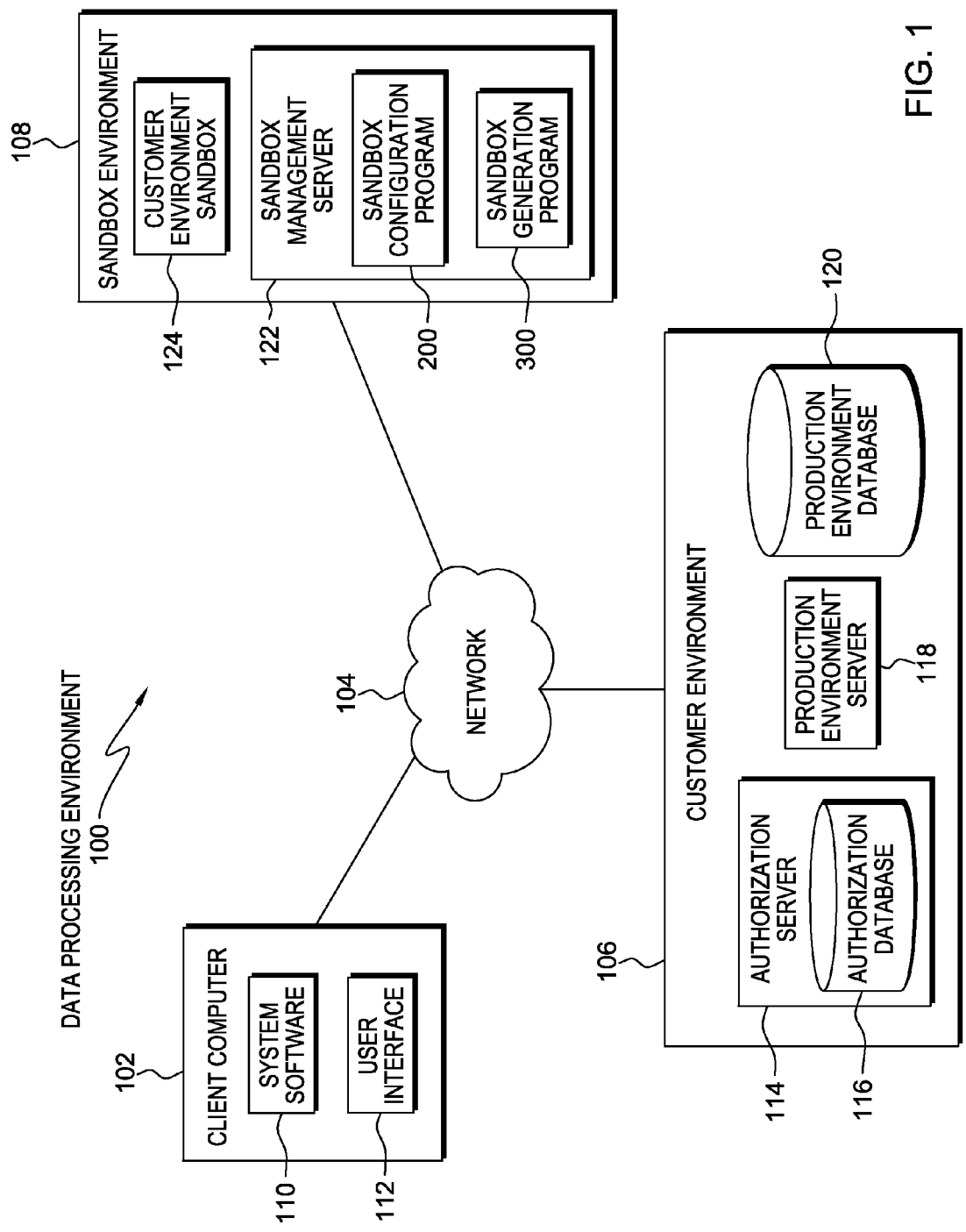
FIG. 1 is a functional block diagram of a data processing environment in accordance with an embodiment of the present invention.

Embodiments of the present invention recognize that if a critical issue only occurs in a production environment, and is unable to be reproduced in a test environment, it is very difficult to diagnose and resolve the issue. In such situations, the production environment may include sensitive information that a business may be unwilling to share. Attempting to reproduce the issue occurring in the production environment can take a significant amount of time, and there is no guarantee that the issue will be truly reproduced. Production environments with unique characteristics increase the difficulty of reproducing the issue in a testing environment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating data processing environment 100, in accordance with one embodiment of the present invention.

Data processing environment 100 includes client computer 102, network 104, customer environment 106, and sandbox environment 108. In an exemplary embodiment, a user utilizes client computer 102 to access customer environment 106 and sandbox environment 108 through network 104. In various embodiments of the present invention, client computer 102 may be a workstation, personal computer, personal digital assistant, mobile phone, or any other device capable of executing program instructions. In general, client computer 102 is representative of any electronic device or combination of electronic devices capable of executing machine-readable program instructions, as described in greater detail with regard to FIG. 4. In an example, data processing environment 100 may include more than one client computer 102 to access customer environment 106 and sandbox environment 108. System software 110 is located on client computer 102 and may exist in the form of operating system software, which may be Windows®, LINUX®, and other application software such as internet applications and web browsers. A user interface 112 is located on client computer 102 and can allow a user on client computer 102 to input information into customer environment 106, and sandbox environment 108.

Network 104 can be, for example, a local area network (LAN), a telecommunications network, a wide area network (WAN) such as the Internet, or a combination of the three, and include wired, wireless, or fiber optic connections. In general, network 104 can be any combination of connections and protocols that will support communications between client computer 102, customer environment 106, and sandbox environment 108 in accordance with a desired embodiment of the present invention.

Customer environment 106 is a client production environment depicted in the form of a collection of computing systems and databases including authorization server 114, production environment server 118, and production environment database 120. Authorization server 114 and production environment server 118 can be desktop computers, specialized computer servers, or any other computer systems known in the art. In certain embodiments, authorization server 114 and production environment server 118 represent computer systems utilizing clustered computers and components (e.g., database server computers, application server computers, etc.) that act as a single pool of seamless resources when accessed through network 104. In general, authorization server 114 and production environment server 118 are representative of any electronic device or combination of electronic devices capable of executing machine-readable program instructions, as described in greater detail with regard to FIG. 4. In an embodiment, authorization server 114 includes authorization database 116. Production environment database 120 and authorization database 116 can be implemented with any type of database storage that is capable of storing data which may be accessed and utilized by client computer 102, elements of customer environment 106, and elements of sandbox environment 108, such as a database server, a hard disk drive, or flash memory.

In one embodiment, authorization server 114 controls the ability of client computer 102 to access customer environment 106. Authorization database 116 includes security policies, login information, and other forms of sensitive information that customer environment 106 can utilize. In an example, when client computer 102 accesses customer environment 106, client computer 102 utilizes user interface 112 to input information into authorization server 114 in order to determine whether client computer 102 is permitted to access content in customer environment 106. In one embodiment, production environment server 118 is a representation of server computers in a client production environment, and production environment database 120 is a representation of databases and storage devices in a client production environment. In an exemplary embodiment, production environment server 118 and production environment database 120 can include system level configuration files, software registries and configuration files, network traces, performance information and snapshots, physical and virtual resources, software logs and traces, workload information, scripts, and process information of customer environment 106.

Sandbox environment 108 represents a collection of computing systems and environments which can access customer environment 106 through network 104 in order to replicate the production environment depicted in customer environment 106. In one embodiment, sandbox environment 108 includes sandbox management server 122 and customer environment sandbox 124. In one exemplary embodiment, sandbox configuration program 200 and sandbox generation program 300 exist in the form of programs included in sandbox management server 122, or an application suite or framework included in sandbox management server 122. Client computer 102 can access Sandbox management server 122 through network 104 in order to configure parameters and inputs of customer environment sandbox 124, and access sandbox configuration program 200 and sandbox generation program 300. Client computer 102 may interact with elements of sandbox management server 122 through inputs into user interface 112. In an embodiment, sandbox management server 122 controls inputs, configuration parameters, and testing procedures of sandbox environment 108. Sandbox management server 122 can represent a server computer or system of computers as previously discussed with regard to authorization server 116 and production environment server 118.

Customer environment sandbox 124 utilizes sandbox configuration program 200 to configure parameters responsive to user and system specifications, as discussed in greater detail with regard to FIG. 2. Sandbox generation program 300 generates an output image of customer environment 106 in the form of customer environment sandbox 124, as discussed in greater detail with regard to FIG. 3. In one embodiment, sandbox configuration program 200 and sandbox generation program 300 can be located separate from sandbox management server 122 in a remote storage medium in data processing environment 100.

In an exemplary embodiment, customer environment sandbox 124 is a secure sandbox replication of customer environment 106, and includes secure replications of all elements of customer environment 106. Customer environment sandbox 124 can build frameworks for solution deployments, test inputs into the environment, and verify results of customer environment 106. In one embodiment, customer environment sandbox 124 can track changes and differences between results in customer environment 106 and customer environment sandbox 124. In an example, sensitive information that authorization server 114 and authorization database 116 includes can undergo a uniform transformation to protect sensitive information, while maintaining important characteristics of sensitive information, into customer environment sandbox 124. The process of uniformly transforming sensitive information into customer environment sandbox 124 will be discussed in further detail with regard to FIGS. 2 and 3. In one embodiment, customer environment sandbox 124 can include an output image of customer environment 106, the process for defining and generating an output image of customer environment 106 will be described in further detail with regard to FIGS. 2 and 3.

FIG. 2 is a flowchart depicting operational steps of sandbox configuration program 200 in accordance with an exemplary embodiment of the present invention. In this embodiment, sandbox configuration program 200 configures parameters for sandbox generation program 300, which are used to create customer environment sandbox 124.

In step 202, sandbox configuration program 200 receives a definition of a production environment to be replicated for simulation. In one embodiment, the production environment may be customer environment 106 in its entirety, or a subset of customer environment 106. For example, a user may define a subset of customer environment 106 for sandbox configuration program 200 to replicate, and the subset definition would include network traffic information from customer environment 106. In one embodiment, sandbox configuration program 200 can interpolate characteristics of the production environment in order to scale the size of customer environment sandbox 124. The definition of the production environment includes selecting custom and product provided plug-ins, source inputs, and other parameters of the production environment that customer environment sandbox 124 is to include. Plug-ins that the production environment includes may be located in production environment server 118 or production environment database 120 and can represent any program or process that is a part of customer environment 106. In one exemplary embodiment, a specific time frame (i.e. 2 pm-4 pm) of customer environment 106 may be defined. Definition of the production environment can be accomplished through user input into sandbox configuration program 200, and in the form of prompts or other methods. In another embodiment, product defined and custom plug-ins that the defined production environment includes may include parameters that plug-ins define, or require user definition of parameters that sandbox configuration program 200 utilizes.

In step 204, sandbox configuration program 200 receives a definition of security policies for the production environment. The definition of security policies may be accomplished through information provided from default or program provided plug-ins, or user definitions. In one embodiment, security policies determine which data in customer environment 106 is sensitive or confidential, which indicate information that requires transformation before sandbox configuration program 200 can utilize information. In another embodiment, security policies define an encryption method preference for transformation of elements and information that customer environment 106 contains to customer environment sandbox 124.

In step 206, sandbox configuration program 200 receives a definition of a desired output mechanism. In one embodiment, the output mechanism is the form in which the replication of customer environment 106 to customer environment sandbox 124 occurs. In another embodiment, the output mechanism can be a report to track changes to an environment over time. The possible forms of the output may include, but are not limited to, virtual machine images, operating system images, a set of scripts, and data and configuration files. In an example, an output image may generate a use case that captures environments and configurations for reuse in order to demonstrate Proof of Concept (POC), or other forms of demonstrations and deployments. In this example, utilizing the output image as a use case can reduce set up times and provide consistent deployment of a given environment.

In step 208, sandbox configuration program 200 configures parameters for the customer environment sandbox responsive to the definitions. In this embodiment, sandbox configuration program 200 operates to configure parameters for the generation of customer environment sandbox 124 corresponding to, at least in part, types of inputs, sensitive components of the environment, plug-ins, transformation methods for sensitive data, and output options. A result of sandbox configuration program 200 is that sandbox generation program 300 can generate secure replication of customer environment 106 in the form of customer environment sandbox 124 responsive to certain parameters.

FIG. 3 is a flowchart depicting operational steps of sandbox generation program 300 in accordance with an exemplary embodiment of the present invention. In one embodiment, sandbox management server 122 utilizes sandbox generation program 300 to generate a secure sandbox replication of customer environment 106 responsive to configuration inputs of sandbox configuration program 200. Sandbox generation program 300 generates customer sandbox environment 124 through the phases of loading inputs and plug-ins, uniformly transforming sensitive input data and characteristics, and generating an output image of customer environment 106.

In step 302, sandbox generation program 300 accesses the desired production environment. Step 202 of sandbox configuration program 200 defines the desired production environment. In an example, sandbox generation program 300 accesses customer environment 106, which is the desired production environment, through network 104.

In step 304, sandbox generation program 300 loads custom and product provided plug-ins, and identifies source inputs. In one embodiment, step 304 of sandbox generation program 300 prepares elements of production environment server 118 and production environment database 120 for replication into customer environment sandbox 124. Elements and plug-ins that customer environment 106 includes allow customer environment sandbox 124 to understand inputs of the production environment. The identification of source inputs occurs so that the transformation of inputs into customer environment sandbox 124 maintains security of sensitive input information.

In step 306, sandbox generation program 300 uniformly transforms source inputs. In one embodiment, sandbox generation program 300 transforms inputs to customer environment 106 so that the inputs sensitive information is secure, while maintaining key characteristics of inputs. Inputs that require transformation may include, but are not limited to, login information, Internet Protocol (IP) addresses, content host information, or other inputs. In an exemplary embodiment, sandbox generation program 300 transforms login information and passwords. In this embodiment, the data string can be parsed to identify key characteristics which can include string length, alpha numeric values and location, special characters and location, character casing, or other characteristics of login and password information. Once sandbox generation program 300 identifies key characteristics, sandbox generation program 300 replaces the string with a new string that maintains key characteristics of the original string without exposing the value of the original string. Sandbox generation program 300 can then uniformly replace the original string across all occurrences in customer environment 106 so that customer environment sandbox 124 will not expose the original string. In one embodiment, sandbox generation program 300 can utilize a process similar to the transformation and replacement of the login information and password for transformation of other data types. In one embodiment, sandbox management server 122 can utilize step 306 of sandbox generation program 300 to uniformly transform sensitive information in authorization server 114 and authorization database 116 through use of standard and custom defined plug-ins and according to security policies of customer environment 106.

In step 308, sandbox generation program 300 creates a specified output image of the production environment. In one embodiment, sandbox generation program 300 replicates transformed content from step 306, plug-ins and applications from step 304, along with system configurations and other resources from customer environment 106 to create the output image of the production environment. In an exemplary embodiment, in step 202 of sandbox configuration program 200 the user may have defined a specific time frame of operation for the desired production environment. In such an example, sandbox generation program 300 utilizes information from the production environment for the time frame to create an output image that replicates the defined production environment. The output image of sandbox generation program 300 is represented as customer environment sandbox 124 in FIG. 1, and contains transformed elements of customer environment 106. In one embodiment, the output can be a virtual image for replaying the transformed replication of customer environment 106 in order to reproduce behavior experienced in customer environment 106. By transforming customer environment 106 into customer environment sandbox 124, sandbox generation program 300 can capture application traces order to learn more about a problem being that customer environment 106 may experience, without impacting customer environment 106 or exposing sensitive information.

Figure 4:
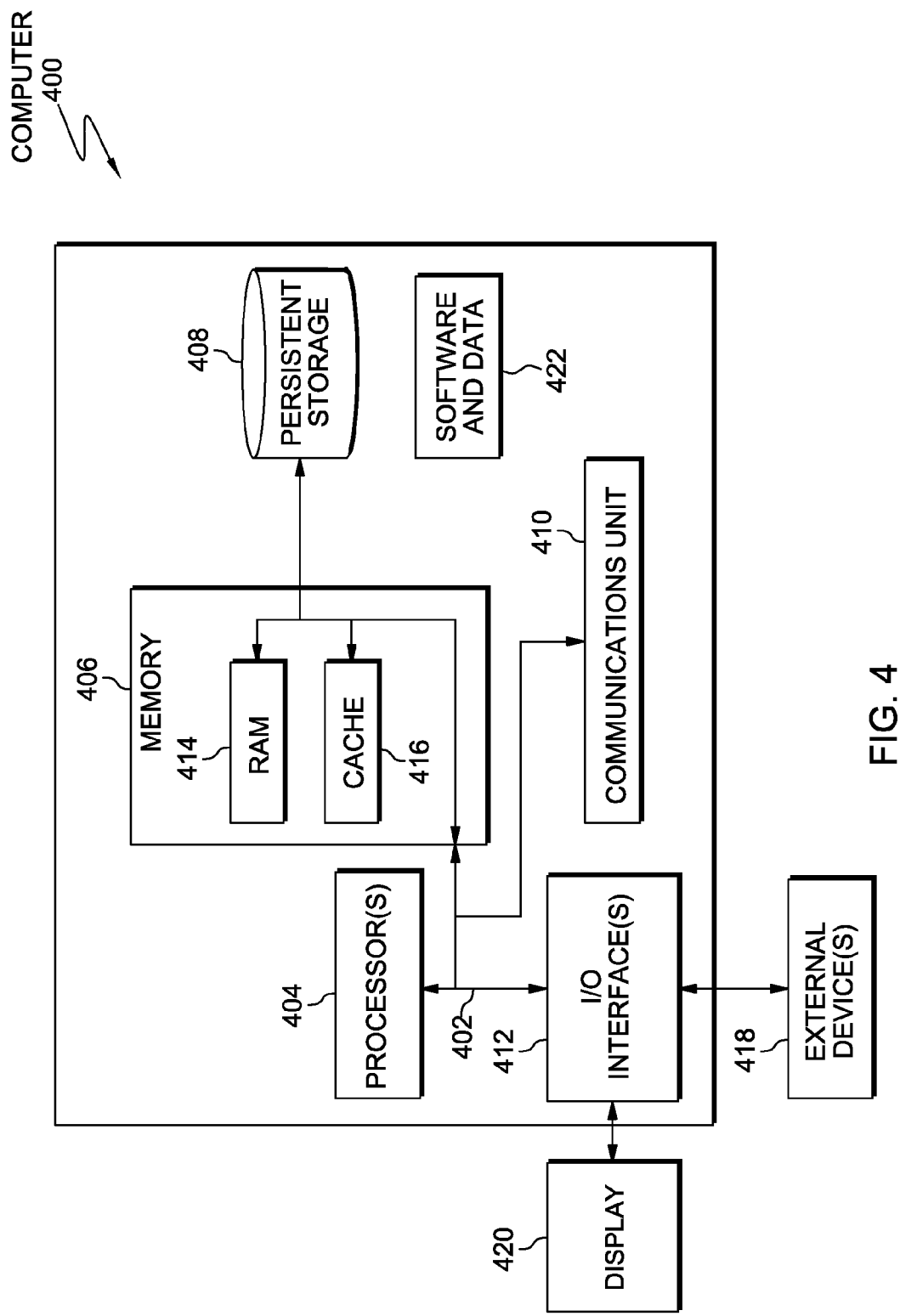
FIG. 4 depicts a block diagram of components of the computers of FIG. 1 in accordance with an embodiment of the present invention.

FIG. 4 depicts a block diagram of components of computer 400, which is representative of client computer 102, authorization server 114, production environment server 118, and sandbox management server 122, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media. Software and data 422 can be stored in persistent storage 408 for access and/or execution by processor(s) 404 via one or more memories of memory 406. With respect to client computer 102, software and data 422 includes system software 110. With respect to authorization server 114, software and data 422 includes authorization database 116. With respect to sandbox management server 122, software and data 422 includes sandbox configuration program 200 and sandbox generation program 300.

In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Software and data 422 may be downloaded to persistent storage 408 through communications unit 410.

I/O interface(s) 412 allows for input and output of data with other devices that may be connected to computer 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data 422 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor. Display 420 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for generating a secure sandbox environment, the method comprising:
   a computer identifying components of a production environment including one or more server computers, one or more storage devices, and one or more applications, wherein the production environment includes sensitive information and utilizes the sensitive information during operation;
   the computer receiving a security policy that defines which information included in the production environment is sensitive information, and in response, identifying the sensitive information that is stored in the production environment based on the received security policy, wherein the identified sensitive information comprises: a first set of sensitive information that includes user names and passwords, and a second set of sensitive information that includes confidential data that the production environment utilizes after a login to the production environment;
   the computer modifying the second set of sensitive information that is stored in the production environment, in a manner that allows the production environment to utilize the modified sensitive information without error or additional modification to the modified sensitive information, and the identified sensitive information cannot be identified from the modified sensitive information; and
   the computer generating a sandbox environment based, at least in part, on the identified components of the production environment and the modified sensitive information, wherein the generated sandbox environment is capable of utilizing the modified sensitive information in the same manner that the production environment utilizes sensitive information.

2. The method of claim 1, wherein the modifying the second set of sensitive information that is stored in the production environment, comprises program instructions to:
   the computer modifying the first set of sensitive information and the second set of sensitive information stored in the production environment, such that the production environment could utilize the modified first set of sensitive information and the modified second set of sensitive information without error or additional modification, and such that the identified sensitive information cannot be identified from the modified first set of sensitive information or the modified second set of sensitive information.

3. The method of claim 1, wherein said modifying the second set of sensitive information that is stored in the production environment, comprises:
   the computer identifying key characteristics of a data string corresponding to an instance of the second set of sensitive information that is stored in the production environment, wherein the identified key characteristics provide an indication of the composition of the data string;
   the computer modifying the data string based on the identified key characteristics of the data string to create a modified data string, wherein the modified data string maintains the key characteristics of the data string corresponding to the instance of sensitive information without exposing the information contained in the data string of sensitive information; and
   the computer replacing the data string corresponding to the instance of sensitive information with the modified data string.

4. The method of claim 3, wherein the identified key characteristics comprise one or more of: length of the data string, alpha numeric values location within the data string, special characters and location within the data string, and capitalization of characters within the data string.

5. The method of claim 3, wherein the identified key characteristics comprise length of a data string corresponding to an instance of sensitive information.

6. The method of claim 1, wherein a format of the generated sandbox environment comprises one or more of, virtual machine images, operating system images, and a set of scripts.

7. The method of claim 1, wherein said identifying components of the production environment further comprises identifying a specified period of operation for the production environment.

8. The method of claim 1, wherein the sensitive information comprises confidential data of users of the production environment that is stored in the production environment.

9. The method of claim 1, wherein said modifying the second set of sensitive information that is stored in the production environment, further comprises:

accessing and load inputs and plug-ins that are included in the identified components of the production environment, and wherein the received security policy provides a definition that the loaded inputs and plug-ins are sensitive information.

* * * * *